Oct. 30, 1962   P. M. BRUBAKER   3,061,782
SERVO SYSTEM
Filed April 28, 1959
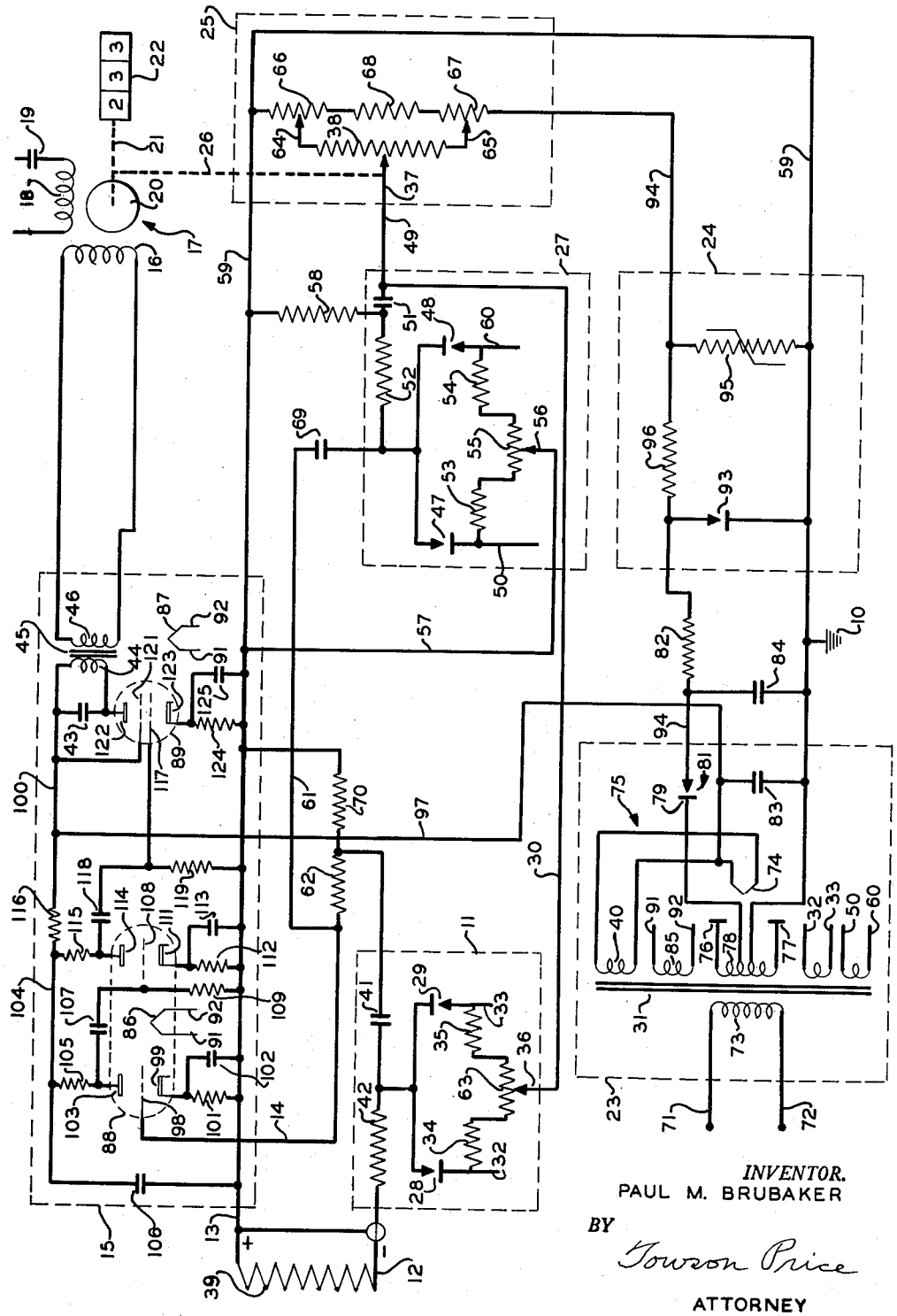
INVENTOR.
PAUL M. BRUBAKER
BY
Towson Price
ATTORNEY

United States Patent Office 3,061,782
Patented Oct. 30, 1962

3,061,782
SERVO SYSTEM
Paul M. Brubaker, Glen Ridge, N.J., assignor to Macbeth Corporation, Newburgh, N.Y., a corporation of New York
Filed Apr. 28, 1959, Ser. No. 809,455
7 Claims. (Cl. 324—99)

This invention relates to a system for obtaining an indication proportional to a direct current voltage applied to input terminals.

An object of my invention is to obtain a digital readout, on mechanically-driven counter wheels, which is proportional to the voltage of direct current applied to input terminals.

Another object of my invention is to provide an arrangement with a very high impedance at the input terminals and a simple yet effective method of preventing hunting or oscillation of motor-driven counter wheels which show the applied voltage.

A further object of my invention is to provide improved apparatus for measuring the value of a condition.

More specifically, the invention is directed to self-balancing potentiometer apparatus wherein direct or steady current is transformed into a fluctuating current of one phase or the opposite phase, depending upon the sense of unbalance at the potentiometer circuit, wherein said fluctuating current is amplified and applied to one field winding of a reversible electric motor, another field winding of which is supplied with a fluctuating or alternating current from a power source, wherein the application of the two fluctuating currents causes operation of the reversible electric motor in one direction or the other depending on the phase of the applied fluctuating current with respect to the phase of the fluctuating current from the power source, and wherein operation of the reversible motor rebalances the potentiometer circuit and also operates exhibiting apparatus which may be counter wheels.

The transforming of the direct or steady current to a fluctuating current may be accomplished by a vibrator such as vibrating switching mechanism, vibrating microphone apparatus, or equivalent arrangements. However, I prefer to use a standard-type diode chopper to change the incoming D.C. signals into alternating current signals.

These and other objects and advantages will become apparent from the following detailed description when taken with the accompanying drawing. It will be understood that the drawing is for purposes of illustration and does not define the scope or limits of the invention, reference being had for the latter purpose to the appended claims.

In the drawing, wherein like reference characters denote like parts, the sole figure is a circuit diagram showing one embodiment of my invention.

Referring to the drawing in detail, the parts of the diagram may be subdivided as indicated by dotted enclosing lines, into a direct current chopper system 11 which receives the incoming signal through lead 12, here indicated as minus (—), the return for the signal being through lead 13, which shields lead 12 as illustrated. The chopper system 11 is connected by a lead 14 to an amplifier or amplifying system 15, to which system is also connected the return lead 13, here indicated as plus (+) and shown grounded at 10.

The amplified current feeds one field winding 16 of a reversible rotating field type motor 17 which also has a field winding 18 fed from a source of alternating current, desirably through a condenser 19. The condenser 19 is desirably so selected with respect to the field winding 18 as to provide a proper phase relation between the fields of windings 18 and 16 for maximum torque on the rotor 20.

The rotor 20 is desirably connected mechanically, as indicated at 21 to counter wheels or other exhibiting or indicating means 22. The exhibiting means will, of course, indicate the condition being measured. If temperature is being measured, the indication will be, for example, in degrees centigrade or Fahrenheit, if light density as intensity is being measured, the indication will be in units of density. The chopper arrangement 11 is connected to a power supply system 23. This system includes a rectifier 75. The system 23 is also connected to the amplifying system 15 and a circuit 24 for establishing a voltage reference standard. Circuit 24 is, in turn, connected to a balancing potentiometer system 25, driven by a mechanical connection 26 from the rotor 20. Between the balancing potentiometer system 25 and the chopper and amplifying systems 11 and 15, respectively, there is desirably an anti-hunt circuit generally designated 27, which may also include a chopper, which will be explained in detail hereinafter.

Specifically, the illustrated embodiment of my standard-type diode chopper 11 includes a pair of diodes 28 and 29 oppositely connected directly to a power supply system of 60 cycle current, as from the transformer 31, forming part of the power supply system 23, using terminals 32 and 33 of a section of the secondary windings 40. Every half-cycle the diodes conduct, each then dropping its resistance to a value not more than 1/100 of that during the non-conducting half-cycle. A direct current return path is provided for the diodes through resistors 34, 35 and 63, the movable arm 36 of the adjusting resistor 63, along lead 30 to the slider or moving element 37 of a potentiometer resistor 38, forming part of the balancing potentiometer system 25.

The incoming direct current signal voltage on lead 12 which, as an example, may be from one terminal of a series of thermocouples 39 responding to a condition such as the temperature within a furnace (not shown), the other terminal of which is connected to the lead 13, will be alternately, that is, every half cycle of 60 cycles, chopped into pulses after passing resistor 42, resulting in a 60 cycle voltage at the condenser 41, proportional to the amplitude of the incoming signal.

The direct current return path from the movable arm 36 can be set at a voltage above ground level by the potentiometer resistor 38. The potentials at the ends of this resistor are, in turn, adjusted by appropriately moving the sliders 64 and 65 along these resistors 66 and 67, respectively. The latter resistors may be in series with a resistor 68 therebetween. If, as is desirably the case at null position, this voltage is made equal to the incoming direct current signal, there will then be no resulting alternating current output signal at the condenser 41.

By sufficiently amplifying the alternating current signal passed by condenser 41, and phasing it properly, it can be used to drive the rotor 20 which, in turn, moves the potentiometer slider 37 in such a direction that it reduces the potential across the diode switch or chopper 11 to zero. At such time the motor will stop, since the null point is then reached and there is no longer any alternating current signal driving it. Furthermore, since the voltages at both ends of the resistor 42, through which the incoming signal passes, are equal, there is no current flowing through this resistor and, therefore, no current drawn from the source of direct current incoming signal except for very small leakage currents. The input resistance to this circuit will, consequently, be very high.

The amplifier 15 is here shown as a three-stage type, including a condenser 43 in parallel with primary winding 44 of the output transformer 45. The secondary winding 46 of this transformer is connected to the field winding 16 of the motor 17. This condenser 43 is desirably so selected as to provide a resonant circuit for the purpose of improving efficiency of the output transformer 45 and of filtering out unwanted harmonics and noise from the amplified signal. Such an arrangement insures that the motor 17 will run one way or the other, depending on the direction of the unbalance of the potentiometer 38, to move its slider 37 to a condition of balance with respect to the signal.

As the gain of the amplifier 15 is increased to improve its sensitivity and accuracy, there will be a tendency of the motor 17 to hunt. There is desired an alternating current signal opposing that of the main balancing signal and of an amplitude proportional to the speed of the motor. Such an opposing signal will tend to slow down the motor as the potentiometer approaches the balance point. Just before reaching said balance point, if the motor is still going too fast, the balance signal will actually tend to reverse the direction of the motor, thereby assuring that it will stop at the null point.

This alternating voltage proportional to the speed of the motor is, in the present embodiment, obtained from an additional diode chopper forming part of the anti-hunt circuit 27. This chopper comprises a pair of diodes 47 and 48 oppositely connected in parallel to the slider 37 through lead 49, condenser 51 and resistor 52. The diodes 47 and 48 are also connected to a power supply system of 60 cycle current, as from the terminals 50 and 60 of one of the secondary windings 40 of transformer 31. A direct current return path is provided for the diodes 47 and 48 through resistors 53 and 54, connected by adjusting resistor 55 contacted by movable arm 56 which is connected, as indicated, by lead 57 to the grounded lead 59 of the amplifying system 15. Thus, the direct current voltage from the potentiometer resistor 38 is connected through an RC differentiator consisting of the condenser 51 and a resistor 58 which connects with the amplifier grounded lead 59.

The alternating current output of the chopper diodes 47 and 48 is connected to the amplifier 15 in parallel with the main signal from the chopper arrangement 11 through condenser 69 as by means of lead 61. Since the anti-hunt chopper of the circuit 27 obtains its signal through the condenser 51, such a signal will be present only when there is a change in the direct current output of the potentiometer resistor 38. It may, therefore, be considered as a first differential of the main signal. The faster the rate of change, the greater will be the anti-hunt signal. As the potentiometer slider element 37 approaches its null point, the anti-hunt signal will oppose the main signal and slow down the rotor 20 so that the slider element will not overshoot if the rotor is then going too fast.

The anti-hunt circuit 27 herein disclosed has the advantage over some anti-hunt circuits in that it draws no current from the potentiometer resistor 38 at the null point so that the accuracy of the balance is not then affected. The combination of the condenser 51 and the resistor 58 is desirably chosen to have a time constant matching that of the motor and gearing or other mechanical connection. The strength of the anti-hunt signal with respect to the main balancing signal can be varied by means of a resistor 62, the input end of which is maintained above ground by resistor 70. The resistors 63 and 55, contacted by the movable arms 36 and 56, respectively, are used only on initial adjustment to balance the resistance of the respective diodes.

The power supply and rectifier system 23 receives the energy through leads 71 and 72 from a commercial source of, say 60 cycle power. These leads energize the primary winding 73 of the transformer 31. One of the coils 40 of the secondary winding energizes the heater or cathode 74 of a full-wave rectifier, generally designated 75, said heater being common to the two plates 76 and 77 thereof. The plates are, respectively, connected to the opposite ends of a coil 78 of the secondary winding of the transformer 31, an intermediate point of which is connected to the cathode 79 of a diode 81. The plate of said diode is connected through a resistor 82 to the voltage reference standard circuit 24.

The center point on said coil 78 is, in turn, connected to the grounded lead 59. The condenser 83 is connected between the circuit to the cathode 74 and said grounded lead 59 and a condenser 84 is connected from the lead 94 between the resistor 82 and the diode 81 to the grounded lead 59. The remaining coil 85 of said secondary winding serves to energize through leads 91 and 92 the cathode heaters 86 and 87 of the double electron tube 88 and the power tube 89, respectively.

There is a Zener diode 93 in the circuit 24 connected between the lead 94 and the grounded lead 59. Such a diode has a resistance which increases when hot. This is compensated for in the same circuit by a "thermistor" 95 connected across the leads 94 and 59, said "thermistor" having a negative temperature coefficient; that is, the higher the temperature, the lower the resistance. Connecting sections of the lead 94 between the Zener diode 93 and the "thermistor" 95 is a resistor 96. The combination of these parts, 93, 95 and 96 serves to maintain a substantially uniform direct potential at the output end of the voltage reference standard circuit 24 for application to the balancing potentiometer circuit 25.

Although the amplifying circuit 15 will be understood by those skilled in the art without further explanation, it is thought advisable to complete the description thereof by pointing out that it receives its plate potential through lead 97 which is, in turn, filtered by condenser 83. The control of the electron tube 88, which may be of the type 12AX7, is through the lead 14 to grid 98. The cathode 99 is maintained above ground level by resistor 101, bypassed by condenser 102. The first stage plate 103 is connected to the lead 104, and powered from lead 97 through resistor 105.

Condenser 106 is used for additional filtering between the lead 104 and the grounded lead 59. The output from the plate 103 is fed through condenser 107 to grid 108 of the second stage half of the tube 88, which grid is kept above ground level by resistor 109. The second stage cathode is maintained above ground level by resistor 112, bypassed by condenser 113. The second stage plate 114 is connected to lead 104 through resistor 115, between which and the primary winding 44 of the transformer 45 is placed resistor 116.

The third stage power tube 89 has its grid 117 connected through condenser 118 to the plate 114 and maintained above ground level by resistor 119. The screen grid 121 is connected to the lead 100. The plate 122 is connected to the lead 109 through the condenser 43 and the primary winding 44 of the transformer 45, as illustrated. The cathode 123 is maintained above ground level by a resistor 124, across which is connected a bypass condenser 125.

The values of various parts which may be used in the aforedescribed circuit are as follows, but I do not wish to be limited to these values as they are only examples.

Transformer 31 may have a potential of 117 volts applied at its primary winding 73 and deliver 5 volts at its secondary winding 40, and 6.3 volts at its secondary winding 85.

Suitable values for the resistors may be as shown by the following table:

| Resistor Nos. | | Values |
|---|---|---|
| 34, 35, 53, 54, 82 and 112 | kilohms | 2.2 |
| 38 | do | 20 |
| 42, 52, 58, 105 and 119 | do | 220 |
| 55, 63, 66, 67 and 68 | do | 1 |
| 62 | do | 470 |
| 70 | megohms | 4.7 |
| 96 | ohms | 220 |
| 101 | kilohms | 3.3 |
| 109 | megohm | 1 |
| 115 | kilohms | 100 |
| 116 | do | 47 |
| 124 | ohms | 500 |

Suitable values for the condensers may be as shown in the following table:

| Condenser Nos.: | Capacities, mf. |
|---|---|
| 41 and 69 | .0047 |
| 43 | 1 |
| 51 | .05 |
| 83, 84 and 106 | 20 |
| 102 and 113 | 10 |
| 107 | .022 |
| 118 | .1 |
| 125 | 50 |

The rectifier 75 may be one of the 5Y3 type. The power tube 89 may be one of the 6L6 type. The Zener diode 93 may be of the 1N1821 type, while the thermistor 95 may have a resistance of 1500 ohms.

From the foregoing disclosure it will be seen that I have not only provided an input and balancing circuit for use in a servo-system to obtain a digital readout on exhibiting means, such as mechanically driven counter wheels, but one which may also be used for giving an indication by other methods, such as by movement of a pointer over a dial or that of a calibrated wheel with respect to a pointer, etc. It should also be understood that although I have shown special forms of choppers and a special amplifier, power supply, voltage reference standard circuit, anti-hunt circuit and balancing potentiometer, yet I do not wish to be limited to all of the details set forth, as those skilled in the art will understand that some substitutions may be made without the additional exercise of invention.

Having now described my invention in detail in accordance with the patent statutes, those skilled in the art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In a servo-system, a pair of input leads for applying a unidirectional electrical signal representing variations in a condition, a chopper for transforming the signal from one of said leads into alternating pulses of output, means for amplifying said pulses, a reversible rotating field type motor with two field windings, means energizing one of said windings from an alternating current source, a balancing potentiometer comprising a resistor and a slider movable therealong, means applying a selected potential across the resistor, a connection from said slider through a condenser to a pair of diodes with one set of poles oppositely connected in parallel, means for applying alternating power to the other poles of said diodes across a connecting resistor, a direct current lead path from a selected intermediate point along said resistor to the other of said leads, means connecting the alternating current output from said diodes to the means for amplifying in parallel with said first-mentioned lead, thereby forming an anti-hunt circuit to oppose the output from said chopper, means connecting said motor to said slider to move the same, means energizing said other winding by said amplified pulses so as to cause said motor to rotate a number of revolutions depending on the amount of unbalance caused by said signal, and counter wheels connected to be driven by said motor, whereby the motor operates upon an unbalance of the circuit by the signal to adjust the opposing potential at the slider to balance the output from said chopper, at the same time turning the counter wheels an amount so that they numerically represent the value of the signal.

2. A servo system comprising a pair of input leads to which may be applied a unidirectional electrical signal representing variations in a condition, a potentiometer resistor, means for applying a source of unidirectional reference voltage thereacross, a slider movable along said resistor, means for connecting in balancing relationship said signal across said slider and one end of said potentiometer resistor, a chopper connected to one of said leads for transforming the signal thereat into pulses, means controlled by the output from said chopper for amplifying said pulses, a reversible motor with one field winding energizable by the power of said amplified pulses and another field winding energizable through a condenser from a source of alternating current, means connecting said motor to said slider for balancing the reference voltage applied to said resistor against said signal, and another chopper controlled by the variation in voltage at said slider for feeding to said amplifier opposing pulses in strength proportional to the speed of said motor, in parallel with the first-mentioned pulses, to thereby prevent overrunning of said slider.

3. A servo system as recited in claim 2, wherein the source of unidirectional reference voltage comprises leads from a source of power, a Zener diode connected across said leads, a compensating thermistor also connected across the leads, and a resistor in one of said leads between said diode and thermistor.

4. A servo system as recited in claim 2, wherein the chopper for transforming the signal into pulses comprises a pair of diodes oppositely connected directly to an alternating current power supply, a pair of resistors connected between said diode power connections by an adjustable resistor having a movable arm providing a direct current return path, and wherein said arm is connected to said slider.

5. A servo system as recited in claim 2, wherein the reversible motor drives counter wheels for visually showing the condition being measured.

6. A servo system as recited in claim 2, wherein the other chopper powers an anti-hunt circuit, drawing no current from the potentiometer resistor at the null point, and comprises a condenser and a resistor having a time constant matching that of the motor and gearing and including a resistor for adjusting the strength of the anti-hunt signal with respect to the main balancing signal.

7. A servo system as recited in claim 2, wherein unitary means is provided for supplying power to said source of reference voltage, both of said choppers and said amplifier.

References Cited in the file of this patent

UNITED STATES PATENTS

| 2,367,746 | Williams | Jan. 23, 1945 |
| 2,442,329 | Harrison | May 25, 1948 |
| 2,668,264 | Williams | Feb. 2, 1954 |
| 2,806,207 | Edwards | Sept. 10, 1957 |
| 2,872,641 | Hudson | Feb. 3, 1959 |
| 2,930,956 | Koppel | Mar. 29, 1960 |